United States Patent [19]

Farris et al.

[11] Patent Number: 5,164,355
[45] Date of Patent: Nov. 17, 1992

[54] HIGH CAPACITY COCONUT SHELL CHAR FOR CARBON MOLECULAR SIEVES

[75] Inventors: Thomas S. Farris, Bethlehem; Charles G. Coe, Macungie; John N. Armor, Orefield; Joan M. Schork, Allentown, all of Pa.

[73] Assignee: Air Products and Chemicals, Inc., Allentown, Pa.

[21] Appl. No.: 644,711

[22] Filed: Jan. 23, 1991

[51] Int. Cl.$^5$ .................. B01J 20/20; B01D 53/04
[52] U.S. Cl. ........................ 502/420; 55/66; 55/68; 55/74; 55/75; 502/416; 502/432; 502/434; 502/436; 502/437
[58] Field of Search ............ 502/420, 432, 433, 436, 502/437, 434

[56] References Cited

U.S. PATENT DOCUMENTS

| | | | |
|---|---|---|---|
| 3,801,513 | 4/1974 | Munzner et al. | 252/421 |
| 3,884,830 | 5/1975 | Grant | 252/421 |
| 4,594,163 | 6/1986 | Sutt, Jr. | 210/660 |
| 4,627,857 | 12/1986 | Sutt, Jr. | 55/70 |
| 4,629,476 | 12/1986 | Sutt, Jr. | 55/68 |
| 4,742,040 | 5/1988 | Ohsaki et al. | 502/426 |
| 4,880,765 | 11/1989 | Knoblauch et al. | 502/432 |
| 4,933,314 | 6/1990 | Marumo et al. | 502/416 |

FOREIGN PATENT DOCUMENTS 2086867 5/1982 United Kingdom .............. 502/437

OTHER PUBLICATIONS

Shi Yinrui, et al., "Carbonization of Coconut Shells", Forest Products Chemistry and Industry Institute, Chinese Academy of Forestry, vol. 62, pp. 23-28 (1982).
T. Wigmans, "Industrial Aspects of Production and Use of Activated Carbons", Carbon, vol. 27, 1, pp. 13-22, 1989.
A. Sumann et al., "Modeling of a Pressure-Swing Adsorption Process for Oxygen Enrichment with Carbon Molecular Sieve", Chem. Eng. Technol., pp. 341-351, (1988).

Primary Examiner—Paul E. Konopka
Attorney, Agent, or Firm—Mark L. Rodgers; William F. Marsh; James C. Simmons

[57] ABSTRACT

A coconut shell char having a high oxygen volumetric capacity is provided by crushing and sizing coconut shells to form granules which are then heated in flowing inert gas at a temperature ramp rate of about 2° to 12° C. per minute to a peak temperature of 775° to 900° C. which is then held so that the total heating time is up to 8 hours and thereafter the granular char is cooled in an inert gas atmosphere. The granular char thus produced is oxygen selective in air separation without further modification to narrow the openings of its micropores and has an oxygen volumetric capacity in excess of 8.0 cc/cc. Further modification of this char is provided by contacting it with an oxidizing atmosphere of carbon dioxide or a mixture of inert gas and carbon dioxide, $H_2O$ or $O_2$ at temperatures ranging from 650° to 900° C. until the gasified char has been altered so that its volumetric oxygen capacity is greater than 9.0 cc/cc. The coconut shell char can be further modified directly as prepared or following a gasification procedure by treatment with volatile carbon-containing organic compound which is pyrolyzed to form carbon which reduces the effective pore openings of the original or gasified char.

11 Claims, No Drawings

HIGH CAPACITY COCONUT SHELL CHAR FOR CARBON MOLECULAR SIEVES

FIELD OF THE INVENTION

This invention relates to a method of making a granular char from coconut shells so that the char is especially well adapted for conversion into carbon molecular sieves. In another aspect it relates to a method of making a carbon molecular sieve from coconut shell material. In still another aspect it relates to a granular oxygen selective char having a high oxygen volumetric capacity. In yet another aspect it relates to a gasified coconut shell char which has very high volumetric capacity for oxygen.

BACKGROUND OF THE INVENTION

Carbon molecular sieves which are oxygen selective are generally bimodal porous materials which separate oxygen on a kinetic basis from air. These materials are usually prepared by treating a carbonaceous material (for example: coal, coconut shell char, peat, pitch, carbonized polymers, and the like) with additional carbon-containing species. U.S. Pat. No. 3,801,513 Munzner, et al., (1974) describes obtaining carbon molecular sieves (CMS) for oxygen separation by treating coke having volatile components of up to 5% with a carbonaceous substance which splits off carbon at 600° to 900° C., thereby narrowing the pores present in the coke. The starting coke can be derived from coal, peat, coconut shell, wood or plastics. It has been stated by others that the average pore size of the adsorbent must be below 3 angstroms to effect oxygen separation from nitrogen. The average pore diameter can be adjusted by changing the intensity of the treatment. Example 6 of U.S. Pat. No. 3,801,513 describes coconut shell material having a particle size of 1 to 3 mm which is heated at 3° C. per minute to 750° C., the volatiles being equal to 4.5%, where it is held for 30 minutes while ethylene gas is introduced during the holding period. The material is then cooled under nitrogen. In an evaluation test, a gas product was reported containing 49.5% nitrogen and 50.5% oxygen.

At about the same time, attention was directed to the use of other materials as the base material for making carbon molecular sieves. Japanese Publication No. Sho 49-37036 (1974) describes making a carbon molecular sieve by condensing or polymerizing a phenol resin or furan resin, so that the resin is adsorbed on a carbon adsorbent and thereafter carbonizing the product by heating. The carbonizing can be carried out at 400° to 1,000° C. in an inert gas. The heating rate given is 50° to 400° C. per hour (0.8° to 6.7° C. per minute) and an example is given of heating at 6.7° C. per minute to 650° and 800° C. where the material is held for 1.5 hours. The operation is said to reduce the pore diameter of the carbon adsorbent.

Coconut shell char is a commodity material readily available commercially and is often cited as a suitable base material for preparation of carbon molecular sieves by various modifications. Very little description has been provided, however, about the preparation of the coconut shell char itself. Shi Yinrui, et al., "Carbonization of Coconut Shells", Forest Products Chemistry and Industry Institute, Chinese Academy of Forestry, Vol. 6, No. 2, pages 23-28 (1982), describes making coconut char for the production of activated carbon by heating the shells to 720° C. Carbonization is said to be complete at 550° C., using heating rates of 10° and 20° C. per minute. At lower carbonization temperatures, it is stated that the rate should be less than 10° C. per minute.

U.S. Pat. No. 4,594,163, Sutt, Jr., (1986) describes a continuous process for making a CMS beginning with a charred naturally occurring substrate and using non-activation conditions, i.e. non-oxidizing, and no addition of pore-constricting or blocking materials. The process is stated to involve heating the char, e.g., coconut shell char made by the process described in U.S. Pat. No. 3,884,830, to 900° to 2,000° F. for 5 to 90 minutes. The examples heat to 1800° F. (982° C.) and higher. The CMS product is said to have improved oxygen capacity at 25° C. of 4.00 to 6.00 cc/cc, and average effective pore diameters of 3 to 5 angstroms. As an example, representing prior art, charred coconut shell is prepared by heating at 5° C. per minute to 500° C., crushing and sieving the char to obtain 20×40 mesh (U.S. sieve) material and then treating in nitrogen by heating at 5° C. per minute to 950° C. and holding for 2 hours. The product had a volumetric oxygen capacity of only 0.8 cc/cc. For the preparation of the coconut shell char, reference was made to U.S. Pat. No. 3,884,830, Grant (1975), which describes preparing activated carbon from starting material such as bituminous coal and charred materials such as coconut char. The coal or char is crushed, sized and mixed with a binder and either agglomerated or compressed into shapes which are then crushed and screened. Activation proceeds by air baking at 300° to 400° C. and calcination at 850° to 960° C. No information is given on preparation of the starting charred materials.

U.S. Pat. No. 4,627,857, Sutt, Jr., (1986) describes preparing a CMS for oxygen/nitrogen separation by continuous calcination of agglomerated non-coking or decoked carbonaceous material, such as coconut char. The agglomerated substrate includes a thermal binder and is sized and screened or pelletized. Calcining is carried out under inert gas purge at 250° to 1,100° C. for at least one minute, preferably 10 to 60 minutes. Examples give oxygen capacities at 25° C. for the product CMS of 2.25 to 4.44 cc/cc. For information on the starting char material, reference is made to the above mentioned U.S. Pat. No. 3,884,830.

U.S. Pat. No. 4,629,476, Sutt, Jr., (1986) describes making a CMS said to have improved selectivity for gas or liquid separations by impregnating a carbonaceous substrate, e.g. coconut shell char, with an organic polymer having a molecular weight of at least 400 or an inorganic polymer at a dosage rate of at least 0.001 wt. %. Further modifications of the impregnated sieve by charring at 250° to 1,100° C. is disclosed.

It is common in discussions of preparing CMS from coconut shell charcoal to direct the preparation of the char into a pellet for use in separation processes. U.S. Pat. No. 4,742,040, Ohsaki, et al., (1988) describes making CMS by combining coconut shell charcoal with a binder of coal tar or coal tar pitch, pelletizing and carbonizing the pellets at 600° to 900° C., removing soluble ingredients from the pellets with a mineral acid, drying the pellets, adding a distilled creosote fraction and reheating to 600° to 900° C. for 10 to 60 minutes. Oxygen capacities at 25° C. of about 6.0 to 7.0 milliliters per gram are disclosed for the product CMS and 8.0 milliliters per gram for the raw carbonized charcoal which is non-selective. A similar approach of converting the carbonized material into pellets is given by U.S. Pat. No. 4,933,314, Marumo, et al. (1990) which describes making CMS from spherical phenol resin powder mixed with a binder and pelletized and heated to carbonize the pellets. In making the CMS, various materials such as finely divided cellulose, coconut shell, coal, tar, pitch or other resins can be added in small amounts to improve workability, e.g. in pellet molding. The use of pelleted CMS, besides involving expensive processes for forming the pelletized material, invariably suffers from residual binder material or its decomposition products in the pores of the CMS, thereby reducing its overall capacity. It is highly desirable, therefore, to be able to develop a carbon molecular sieve which is granular and can be used directly in an adsorbent bed for separations without going through a pelletizing process.

Modifications of carbonized materials are described to involve various steps other than the deposition of carbonaceous materials to narrow sieve pore openings. For example, Wigmans, "Industrial Aspects of Production and Use of Activated Carbons", *Carbon*, Volume 27, 1, pages 13–22 (1989) describes activation of carbonized residues of coal, wood, coconut shell and the like using agents such as steam, carbon dioxide and air to expose internal porosity. Above 800° C., oxygen reacts 100 times faster with carbon than do steam or carbon dioxide, so that activation is possible only under mass-transfer-limiting and product-inhibiting conditions. Pore volume and pore enlargement occurs with increasing burnoff, but an optimum in surface area and micropore volume is observed. Temperatures of 800° to 850° C. are said to seem to be optimum without notable pore shrinking behavior.

The value of using carbon molecular sieves for air separation in pressure swing adsorption (PSA) is documented in Seemann, et al., "Modeling of a Pressure-Swing Adsorption Process for Oxygen Enrichment with Carbon Molecular Sieve", Chem. Eng. Technol., 11, pages 341–351 (1988). This article discusses PSA cycles for separating oxygen from nitrogen and argon using a CMS (commercial CMS N2 material manufactured by Bergwerksverband GmbH, Essen), for which structural data are given as are adsorption equilibria of oxygen, nitrogen and argon at 30° C. It is pointed out that at equilibrium these gases are adsorbed in similar amounts, but oxygen is adsorbed considerably faster because its effective diffusion coefficient is more than 8 times those of nitrogen and argon. Consequently, an almost oxygen-free nitrogen-argon mixture can be recovered during adsorption, and on depressurization of the adsorbent bed, a gas containing over 50 volume percent oxygen may be obtained.

Clearly, the potential for use of carbon molecular sieves in PSA is very high, but the prior art appears to focus on improving the selectivity and adsorption rate of the CMS with little or no attention to enhancing the capacity of the starting material. In pressure swing adsorption the bed volume is often fixed by capital or structural considerations, so that increased volumetric capacity of the CMS offers increased productivity and recovery of $N_2$ from air and thus lowers capital and energy costs for the production of $N_2$ by PSA.

SUMMARY OF THE INVENTION

We have found a method of producing a high capacity, high density carbon molecular sieve material which can be used as a host material for further modification to produce an oxygen selective CMS. Not only does the material, which is made from coconut shells, have enhanced volumetric capacity which can be carried forward through various modifications to the final CMS, but the material can also be produced in granular form without need for pelletizing. We have also discovered that the capacity and the oxygen adsorption rates of this char can be increased by post treating with an oxidant without enlarging the micropores of the carbon beyond 8 angstroms. The method of our invention includes (a) crushing and sizing coconut shells to form shell granules which have a size that would be suitable for use in an adsorbent bed for PSA, (b) heating said granules in a flowing stream of inert gas at an average temperature rate of increase of about 2° to 12° C. per minute to reach a peak temperature of 775° to 900° C. and (c) thereafter holding the peak temperature for a period of time so that the heating and holding steps total up to about 8 hours to produce the granular char and (d) cooling the granular char in an inert gas atmosphere.

Our invention also provides a granular coconut shell char which exhibits oxygen selectivity in air separation without modification to narrow the openings of its micropores and has an oxygen volumetric capacity in excess of 8.0 cc/cc at ambient conditions. A gasified coconut char is also provided by contacting this high capacity char with carbon dioxide or a mixture of carbon dioxide, water, or oxygen in inert gas at a temperature of 650° to 900° C. The gasified char thus formed has a volumetric oxygen capacity greater than 9.0 cc/cc. This gasification treatment is carried out for a time sufficient to increase the oxygen capacity of the char but reduces its oxygen selectivity with respect to nitrogen.

Our invention further provides a method for making carbon molecular sieve, which is suitable for use in air separation by pressure swing adsorption, by modification of the coconut char either directly as formed by the original carbonization step or following the gasification procedure. This modification involves reducing the effective pore openings of the high capacity char by contact with a volatile carbon-containing organic compound under pyrolysis conditions.

DETAILED DESCRIPTION OF THE INVENTION

This invention makes a significant contribution to the technology of air separation with carbon molecular sieves (CMS) by providing the means for increased capacity of the adsorbent. More gas capacity per unit volume of bed of adsorbent in pressure swing adsorption separation of air components leads to both increased recovery and productivity. While it is recognized that selectivity and rates of gas sorption are important, the value of developing increased capacity in the CMS has attracted insufficient attention. Readily available oxygen selective CMS materials exhibit an oxygen gas capacity at 25° C. of less than 8 cc/gm at 1 atm. of oxygen (standard temperature and pressure). Much of the porosity of these commercial materials is made up of both macropores and mesopores generated during the steps of pelletizing and binder burnout while making the CMS material. Although these macropores provide gas transport, they are useless for air separation. It is advantageous to have materials which have higher gas capacity per cc of sorbent. This can be accomplished by higher gas capacity on a weight basis and/or higher density. The higher density means that one can pack more material into the adsorber beds and, consequently, obtain higher productivity per unit volume of adsorbent bed.

A review of available materials and descriptions in the prior art reveals that an upper limit in the gravimetric oxygen capacity of CMS has been about 8 cc/gm. Although activation procedures have been developed to increase the gravimetric capacity (cc/gm) of such carbons, they also decrease the density and, therefore, lower the volumetric capacity (cc/cc). Conversely, increasing the density of the carbon by depositing polymer-based pyrolytic carbon generally reduces volumetric capacity by closing micropore structure. In addition, this supplemental treatment tends to slow gas adsorption rates excessively.

Our invention now provides a method of producing a high capacity, high density CMS material which can be used as a host material for further modification to produce an efficient oxygen selective CMS. The CMS thus produced has the additional advantage of being a granular material so that there is no need for further pelletizing. Furthermore, the capacity and oxygen sorption rates of the base material can be raised by post-treatment with an oxidant without enlarging the micropores beyond 8 angstroms. The resulting product is a valuable material suitable as a base for subsequent micropore narrowing by hydrocarbon pyrolysis, either in one or two steps, to convert the host material to an oxygen selective CMS. A suitable two-step procedure is disclosed in copending U.S. patent application Ser. No. 575,474, filed Aug. 30, 1990, now U.S. Pat. No. 5,098,880.

The literature is replete with procedures designed to improve the efficiency of carbon molecular sieves by treating a carbonaceous material such as coal, peat, pitch, charred polymers, coconut shell char, or charred shells from other nut sources, with additional carbon-containing species which are pyrolyzed and deposit carbon on the starting carbonized base material. Referring to the references discussed in the foregoing Background of the Invention, it is known that such treating procedures employ very controlled temperature ramp rates and specific upper temperatures. Little attention has been paid, however, to the importance of the starting char or carbonaceous material. We have found that the further treatment of the host material depends to a great extent upon the character of the starting char which must be clearly defined. In developing a superior starting char, we have found that coconut shells from a cost/performance point of view provide the most promising source material.

Coconut shells are lignocellulosic material consisting of varying percentages of two major organic components. Cellulose and hemicellulose, collectively considered as holocellulose, are linear polymers of glucose and comprise approximately 62% of the shell. Lignin, a three dimensional polymer of aromatic alcohols, makes up 35%, while the remaining 3% is derived from other intracellular substances (McKay and Roberts, *Carbon*, Vol. 20, No. 2, page 105, 1982). Thermal decomposition is most intense for these components below 500° C. and there is little further decomposition above this temperature. Pyrolysis does not, however, destroy the natural cellular structure of the coconut shell.

This invention provides a process for preparing a dense, high capacity, host material whose adsorption rates can be readily altered. Starting with fresh coconuts, the hard shells are removed and then crushed and sized in order to obtain a granular material which is suitable in size to be used directly in an adsorbent bed for pressure swing adsorption. The size can vary considerably, for example from 0.5 in. chunks down to 200 mesh material or smaller, but uniformity of size is desirable. Mesh sizes (U.S. Sieve) of 18-25, 40-60, 60-80, 80-100, 100-140, and 150-200 are suitable; however fine carbon powders (>60 mesh) are not preferred for PSA units; powders are to be avoided.

This granular shell material is then heated under carefully controlled conditions in a flowing stream of inert gas, preferably nitrogen, at an average temperature rate, referred to as the "ramp" rate, of about 2°-12° C. and, preferably, 2°-10° C. per minute until a peak temperature is reached in the range of 775°-900° C., preferably 775°-825° C. [The set point thermocouple used to control temperature was mounted just outside the metal sleeve used to contain the rotating quartz tube. The temperature within the tube was quite close to this set point temperature]. If the ramp rate has been sufficiently slow and the peak temperature is in the higher end of the range, carbonization of the coconut shell is complete on reaching the peak temperature, but normally it will be desired to hold the peak temperature for a period of time so that the total heating and holding steps together total up to 8 hours. Preferably, the holding time at peak temperature is from about 15 minutes to 1 hour.

The carbonized granular char is then cooled in an inert gas atmosphere. The coconut shell char made in this manner not only has an unusually high volumetric oxygen capacity, but it is also slightly kinetically oxygen selective. The capacity of the char can be improved still further, although destroying the oxygen selectivity, by a post-treatment which involves gasification at elevated temperatures with oxidants, such as carbon dioxide, $H_2O$, or oxygen. The rates of gas adsorption and density of the CMS thus produced have been controlled by pyrolysis parameters, including the heating rate, the atmosphere, the upper temperature limit, and the post-treatment with oxidizing gases or, either alternatively or successively, the deposition of pyrolyzed hydrocarbon to narrow the micropore openings.

Factors which help define the quality of the coconut shell char are its oxygen capacity, rate of oxygen sorption, pore size distribution (percentage of micropores) and density. The oxygen capacity of this material is crucial and can be expressed volumetrically (cc/cc of adsorbent) or gravimetrically (cc/g of adsorbent). All capacities are measured at ambient conditions ($\sim$23° C., $\sim$1 atm $O_2$). The novel granular coconut shell char of our invention exhibits kinetic oxygen selectivity in air separation, even without modification to narrow the openings of its micropores, and it has an oxygen volumetric capacity in excess of 8.0 cc/cc. The volume of gas adsorbed is measured at 1 atmosphere, with pure oxygen at room temperature. It is possible to have a high gravimetric capacity, but an undesirably low volumetric capacity because of a low density of the carbon material. The high volumetric capacity of our improved char and the CMS which can be made from it enables the reduction of the size of adsorbent beds and, consequently, the cost of capital equipment. It is important to realize that specifying capacity in cc/g without specifying the density (and how it is measured) is meaningless. By specifying a volumetric capacity and its Hg pellet density, we have defined a new and preferred regime.

The material is also granular so that it does not need to be pelleted hence, saving an additional process step (2) in the adsorbent manufacturing process. Because large beds of adsorbent are involved in pressure swing absorption, it is necessary to use either an extruded or pelleted material if the CMS is not granular, because a fine powder is unacceptable, for pressure drop considerations through the bed. Also a fine powder as the starting char is of disadvantage in further hydrocarbon pyrolysis so that such powder must first be bound with an agent which permits it to be formed into an extruded pellet.

Although one may have a high capacity base material, it could be inferior to other CMS materials if it did not also have a suitable rate of gas adsorption; that is, sufficient to yield, after post treatment, a CMS with gas uptake rates comparable to (though not necessarily equal to) those of commercial CMS. Material which sorbs gas too slowly forces an increase of cycle time in PSA operations, thereby reducing productivity.

In addition to the importance of adsorption rate and gas capacity, the pore size distribution of a CMS is important. It is desired that a host material with as much micropore volume as possible be used, yet with sufficient meso- or macropores for the transport of gas to the micropores. It is desired for the hydrocarbon deposition procedures described for use with this invention that the host materials should have micropores below 8 angstroms. Micropores larger than 8 angstroms are more difficult to trim down to the critical 3.8 to 4.2 angstrom size which have been found to be effective gates for oxygen separation from air.

Coconut shells available commercially in the United States originate from several sources, including the Caribbean, primarily Costa Rica and the Dominican Republic, as well as from Hawaii and Singapore. Several varieties of coconut are common, including those having a thin shell of about ⅛ inch thick and a thicker shell of about ¼ inch from a football-shaped coconut of the MayPan palm. It has been found that with the proper crushing and sizing, the thickness of the original coconut shell has very little effect upon the quality of the final product. Oxygen adsorption (measured by the CAU method described subsequently) is found to be similar for both the thin shelled coco char and the thicker shelled material, indicating that species and regional variations are of minor consequence to the finished carbon. Dramatic seasonal weather changes (typhoons, droughts, etc) can impact the quality of the coconut. This can influence the density of the char which is produced. Another parameter of importance, however, which could be affected by the source of shell if purchased as a commodity, is the moisture content. For example, with a moisture content of about 20%, it appears that the water driven off during the heating step reacts with off-gases or impedes their removal during the early stages of pyrolysis, which then permits the off gases to crack and restrict micropore openings. Prior air drying at 110° C. eliminates this difficulty.

During the heatup or ramping stage of the carbonization process, an adequate inert purge gas rate is required in order to form a carbon which has its maximum potential for adsorptive capacity and rate. Nitrogen is the inert gas of choice because of its availability and cost. The flow rate will, of course, depend upon the configuration of the furnace and the amount of shell which is being pyrolyzed at one time. The flow rate must be sufficient to carry away from the granules any pore-plugging decomposition products from the volatilized organic material. With the amounts of shell used for pyrolysis in the Examples, nitrogen flow rates ranging from 0.5 to 7.5 liters per minute were examined and an indication of preferred rate under these conditions is about 3 to 7 liters per minute, enabling the production of a fast selective adsorbent. A flow rate below 1 liter per minute was found to be insufficient to remove off gases produced during pyrolysis. Failure to effectively remove hydrocarbons probably permits them to crack and fill the micropores, and this accounts for the inability of the resulting CMS to reach equilibrium within a reasonable time in gas separation operations. For the most part, in the Examples given, a purge rate of about 6.5 liters per minute was maintained. Care should be taken to sweep the entire rector volume.

As pointed out above, a ramp rate of about 2° to 12° C. and preferably 2° to 10° C. per minute is desired. This is an average ramp rate and the actual rate at which temperature is increased from ambient temperature to the peak pyrolysis temperature can be varied. In fact it is possible to practice the invention by heating the raw shell material to a temperature of about 500° C., holding it at this temperature for a period of time and then increasing the temperature at a suitable ramp rate to the peak pyrolysis temperature. Many combinations of stepwise heating are acceptable. For practical purposes, however, and for ease of control, a steady temperature increase or ramp rate is the most feasible way of operating. If a ramp rate below 2° C./minute is used, the overall heating period becomes inordinately long, while ramp rates much above 12° C. per minute reach the peak pyrolysis temperature too soon and run the risk of pyrolysis of off-gas products during the heating step. To minimize this possibility, the purge rate of inert gas and the heating ramp rate should be coordinated to avoid the buildup of off-gases which could decompose to fill the micropores of the char. In addition to a minimum purge required to remove off-gases produced during pyrolysis and a suitable temperature ramp rate, the final pyrolytic temperature influences oxygen and nitrogen adsorption rates to the greatest extent. We have found that chars produced at temperatures over 900° C. adsorb oxygen and nitrogen more slowly and possess less capacity than those prepared within the selected temperature range, regardless of the purge rate.

Coconut chars prepared as described in the Examples were analyzed by mercury porosimetry and helium pycnometry to obtain pore volume and "pellet" (granule) density. Gravimetric oxygen capacity were converted to volumetric oxygen capacities by using Hg pellet density as determined by mercury porosimetry. A trend was observed toward obtaining greater pellet density and higher capacity as the pyrolytic temperature increased above 650° C. However, this trend appears to plateau at 775° C. so that the superior products were made at temperatures from 775° to 850° C. Such carbons have a higher mercury pellet density coupled with a high gravimetric oxygen capacity; the volumetric capacity has been observed as high as 40% above that for readily available commercial CMS carbons. It is recognized of course that low pellet density in commercial sieves results from pelleting powdered char and as much as 66% of the porosity in a pelleted carbon is macropore volume. Coconut base chars prepared as described below, on the other hand, retain micropore volume similar to those of readily available commercial sieves while containing ~60% less macropore volume.

The Hg pellet density of the coconut shell chars of this invention is considerably greater than the density of commercial CMS or of activated carbons and ranges between about 1.15 and 1.2 grams per cc. Some variation in char density resides with the coconut itself and apparently subtle changes in the coconut char density can reflect climatic conditions during the time the coconut is maturing. Traditional values for bulk (tap density) do not provide sufficient distinctions between materials. One the other hand, Hg pellet density provides an extra measure of distinction and we use this to calculate volumetric $O_2$ capacities.

After the pyrolysis period, the granular coconut shell char is cooled in an inert gas atmosphere. It has been found that it desirable to stabilize the char after it has been cooled by passivation by heating in a dry, synthetic air mixture (prepared from $H_2O$-free and $CO_2$-free $O_2$ and $N_2$) at 150° C. for about 15 to 20 minutes. These coconut chars have a highly reactive surface and liberate heat when exposed to ambient air unless passivated. Passified chars stored under dry air or nitrogen are subject to only a slight loss of rate of nitrogen adsorption, whereas if the chars are stored in a humid atmosphere (for example, 50% relative humidity), even though adsorbed water should be completely removed by out-gasing prior to air adsorption during CAU analysis, the rate of nitrogen adsorption can be reduced as much as 60%.

Coconut derived chars prepared at temperatures between 650° and 900° C. exhibit varying degrees of kinetic oxygen selectivity and gas adsorption rates which are attributed to the pyrolytic temperature. As these temperatures are raised, the pore sizes of this char shift below about 4 angstroms and $O_2$ uptake rate (via CAU) becomes slower. A char prepared at 900° C. while being the most selective, still retains excess adsorption capacity in pores of 4 to 4.3 angstroms compared to a 3.5 angstrom CMS. Oxidative treatments of such chars can then be used to enhance the oxygen capacity although reducing significantly the inherent oxygen selectivity of the original char. Subsequent modifications through hydrocarbon cracking in either a single cracking step or a combination of two steps using two hydrocarbons of different molecular dimensions restores oxygen selectivity and improves the percentage of selective pores. CAU adsorption rates for oxygen and nitrogen on thus modified chars are similar to those of readily available commercial materials. One of the features of the coconut chars of this invention is that the predominant micropores are generally not over 8 angstroms and usually not larger than the 4 to 8 angstrom window that is particularly amenable to modification by two-step hydrocarbon pyrolysis.

The pore size of the coconut char can also be modified within the parameters of the invention by varying the time at which the char is held at the peak temperature. In general, shorter hold times on the order of 15 minutes to 1 hour result in faster uptake rates but at approximately the same selectivity as the chars made using a hold time of 4 hours. This would indicate that chars held for less than 1 hour are likely to have smaller effective micro-particle domains (micropore diffusion paths). On the other hand, changing from 2° to 10° C. per minute in ramp rate produces only a marginal increase in adsorption rates. This effect is consistent with the shorter hold times. The use of either nitrogen or argon as the inert gas produces no apparent difference in the chars. Under the same conditions, helium produces a slow but selective adsorbent. The use of carbon dioxide as the purge gas, on the other hand, eliminates oxygen selectivity, although this severe oxidative treatment causes the char to lose only about 5% of its density while increasing its capacity.

After the coconut char has been prepared as described above, it can be further modified by gasification in the presence of either pure carbon dioxide or a mixture of an inert gas and either carbon dioxide, $H_2O$ or oxygen. In this step, while exposed to the oxidizing gas, the char is heated to above 650° C., preferably 750° C. to 900° C. and held at this temperature for a time sufficient to increase its oxygen capacity while reducing its oxygen selectivity with respect to nitrogen. Treating the chars with a mixture of carbon dioxide and helium increases the adsorption capacity but makes them unselective. This step further increases the oxygen capacity of the coconut chars by about 10% over the original material. The improvement in capacity is about 30% above readily available commercial materials.

The gasification procedure can be modified by impregnating the char beforehand with solutions of materials which serve as catalysts, such as potassium hydroxide, calcium nitrate, calcium acetate or nickel acetate. Additional capacity increase can thereby be obtained after reacting with carbon dioxide. The combination of nickel acetate impregnation and carbon dioxide gasification at 800° to 900° C. is very effective in increasing capacity and speeding adsorption rates for the chars. The use of nickel acetate for gasification at 650° C. with 25% carbon dioxide in helium was also effective. Both capacity and adsorption rates increased. Gasification at 800° C. of the char in pure carbon dioxide to increase its capacity is quite feasible and can be performed in about half the time required using a mixture of 25% carbon dioxide in helium. For example, gasification yields very good results at 800° C. in 25% carbon dioxide in helium for 1 hour or with pure carbon dioxide for $\frac{1}{2}$ hour. The addition of inorganic salts to accelerate gasification has a moderate positive impact in the resulting capacity.

After $CO_2$ oxidation, which imparts additional capacity to the original char, selectivity of the CMS can be restored by exposure of the char to a volatile carbon-containing organic compound, preferably a hydrocarbon such a trimethylcyclohexane for 90 to 135 minutes at 590° to 625° C. A secondary treatment with a similar but smaller compound, such as isobutylene at 500° to 530° C. for 15 to 60 minutes provides further selectivity improvement.

As pointed out above, the granular char from coconut shells provided by this invention is much more economical to produce than the pelleted carbon molecular sieves. In pressure swing adsorption, the adsorbent chamber is subjected to repeated pressurizations which create impacts between bed granules and against the chamber walls during the PSA process. The char is very hard and attrition resistant but it is advantageous to grind the char by tumbling, with or without grit, or a comparable technique, in order to smooth sharp edges that might abrade into powder in adsorbent beds.

Oxygen and nitrogen adsorption properties were determined using a Circulating Adsorption Unit. The Circulating Adsorption Unit (CAU) had a Servomix oxygen monitor, 570A with 311 cell and bypass plumbing to allow 0.5-8 liters per minute flow. This was connected to a Cole Parmer pump, N-7088-48 with the head modified with a controller and high torque motor, (G. K. Heller, GT 21), allowing circulation rate to be varied at varying pressures (0.2-1.0 atm.) while maintaining consistent pump speed at any given rate and pressure. The pump led to a glass cell adsorption unit equipped with a thermocouple. The glass cell, in turn, was connected to the oxygen monitor through an MKS barometer, pressure transducer (#127AA001000A), power supply (#PDR-C-1C).

The response time of the $O_2$ monitor was 7 seconds to 90% of scale, and the pump was sized to allow circulation rates of 150-7000 cm$^3$/min. A compression wave does result from the operation of the single diaphragm pump, therefore it is important to record data at a rate which is fast relative to the pump rate. This was accomplished using a MACSYM computer, Model 120, which was programmed to collect data with adjustable frequency throughout the adsorption run.

The CAU pressure transient is the summation of pressure uptake transients for the individual gas components. Using equations for gravimetric uptake, equations were derived which describe the pressure and % $O_2$ traces measured on the CAU. System pressure as a function of time is given by the expression:

$$P = P_i - P_{O2}(1 - e^{-Lt}) - P_{N2}(1 - e^{-mt}) \quad \text{(Equation 1)}$$

where;
$P_i$ = initial system pressure
$P_{O2}$ = oxygen pressure sorbed at equilibrium
$P_{N2}$ = nitrogen pressure sorbed at equilibrium
L,m are mass transfer coefficients for $O_2$ and $N_2$, respectively.

The % $O_2$ measured versus time for air (21% $O_2$) is given by the expression:

$$\%O_2 = 100[0.21P_i - P_{O2}(1-e^{-Lt})]/[P_i - P_{O2}(1-e^{-Lt}) - P_{N2}(1-e^{-mt})] \quad \text{(Equation 2)}$$

Note that $P_{O2}$, $P_{N2}$, and $P_i$ are measured at t=0 and t=infinity, and can be obtained from the CAU data. The mass transfer coefficients can therefore be obtained by fitting equation 1 to the pressure data or by fitting equation 2 to the % $O_2$ data. The kinetic selectivity is the ratio of the mass transfer coefficients, L/m. For attractive $O_2$ selective material for use in PSA operations L should be >3 and selectivity >20.

The amount of $O_2$ sorbed at short times (1 min) exceeds the equilibrium amount of $O_2$ sorbed, and gradually decays back to the equilibrium value as $N_2$ slowly diffuses into the micropores and displaces oxygen. This behavior is not accounted for by eqs. 1 and 2, and they therefore predict a working selectivity that is higher than the actual value. The observed "overshoot" of $O_2$ adsorption above the equilibrium value, which occurs in the kinetic region of the experiment is a competitive adsorption effect. At short times, when $O_2$ has largely saturated the adsorbent but $N_2$ has yet to permeate the adsorbent and approach its adsorptive capacity, $O_2$ will cover adsorption sites over the entire range of energetics. As $N_2$ permeates the adsorbent, it displaces much of the $O_2$ that was sorbed. This occurs owing to the higher heat of adsorption of $N_2$ over $O_2$ on CMS carbons at low pressure ($\leqq 1$ atm), and results in the lowest energy state of the adsorbate/adsorbent system at equilibrium. The net effect is that the apparent equilibrium constant for $O_2$ adsorption is higher in a non-competitive experiment than when $O_2$ competes with $N_2$ for sites (which occurs as equilibrium is approached).

An additional term can be added to eqs. 1 and 2 to account for this behavior. Now:

$$P = P_i - (P_{O2} + P_{ex}e^{-mt})(1 - e^{-Lt}) - P_{N2}(1 - e^{-mt}) \quad \text{(Equation 3)}$$

$$\%O_2 = 100[0.21P_i - (P_{O2} + P_{ex}e^{-mt})(1 - e^{-Lt})]/[P_i - (P_{O2} + P_{ex}e^{-mt})(1 - e^{-Lt}) - P_{N2}(1 - e^{-mt})] \quad \text{(Equation 4)}$$

where $P_{ex}$ is the pressure of $O_2$ sorbed at short time which exceeds the equilibrium pressure of oxygen sorbed. For attractive $O_2$ selective CMS materials for use in PSA operations $P_{ex}$ is usually 3-10 torr. When this additional term is added an excellent fit is obtained, and the selectivity value is in excellent agreement with values determined gravimetrically and volumetrically. $P_f$, the final pressure reading should be <300 torr for desirable $O_2$ selective CMS materials in a PSA unit.

The pressure we measure as a function of time reflects all adsorption which occurs, whereas the % $O_2$ we measure reflects only the selective sorption which occurs. The difference between these measurements represents the unselective adsorption which occurs. By comparing the actual amounts of $O_2$ and $N_2$ sorbed at equilibrium (quantities determined by final experimental conditions) with those calculated by fitting the experimental $O_2$ adsorption data using equation 4, we can quantify the amount of gas sorbed in kinetically selective pores versus the amount of gas sorbed in non-selective pores.

CAU RUN DESCRIPTION

The CAU unit has a total volume of 106 cc of which 27 cc comprise the adsorption cell. To obtain the most accurate results the cell is fully loaded with the carbon (typically 11.5 to 13.9 g depending on the pellet density and size) and outgassed at 110° C. under vacuum until the pressure is less than 0.01 torr. Evacuation is continued for an additional hour. The sample is cooled to room temperature (~23° C.) under dynamic vacuum, sealed against ambient atmosphere using a stopcock and transferred to the CAU. The pressure guage and oxygen monitor are linked to a computer which acquires the raw data. The dead volume of the system is purged with dry air (21.1% $O_2$, 78.9% $N_2$) for five minutes prior to connecting the cell. The gas mixture was blended to insure that the initial composition is always the same. This is important since these values are fixed in the CAU data reduction program, zero air should not be used since its composition varies. After the cell is connected using compression "O" rings and clamps, the pump speed is set to ~250 RPM and the pump is started. After three seconds and stopcocks to the adsorption cell are simultaneously opened the operator monitors $O_2$ composition and decreases the pump rate to <60 rpm when % $O_2$ stabilizes. The computer takes 20 readings per second for the first 30 seconds, two per second for the next 90 seconds, one per second for the following eight minutes, and one every four seconds for the balance of the run, which is typically one hour total. A high pump rate, while the adsorbent is adsorbing oxygen rapidly, compared to nitrogen, allows rapid meter response and does not significantly shift the % $O_2$ trace. After the maximum $O_2$ adsorption occurs, the pump rate is decreased, which allows the adsorption of nitrogen to be monitored with high accuracy and signal/noise ratio. The "noise" in the data is not an artifact of the experiment, rather it shows how pump cycling affects pressure in the different components of the system. We can smooth these points out of the trace, but the raw data give a more true representation of the composition profile. As long as the true position of the trace is evident from the unsmoothed data, the data are fit and used for the plots and calculations.

In order to describe our invention further, the following examples are presented which should be interpreted as illustrative only and not to limit the invention unduly.

EXAMPLES 1-5

Husks were removed and the milk drained from fresh coconuts and 1,000 to 1,100 grams of crushed coconut shell (pieces of about ½" in size) were heated in a muffle furnace to 400° C. at a rate of 2° C. per minute and held at that temperature for up to 4 hours. A nitrogen purge in excess of 7 liters per minute was maintained at all times. 300 to 350 grams of char from this first treatment was then heated to 800° C. at a rate of 2° to 10° C. per minute, and held at the higher temperature for 15 minutes. Here the furnace was slowly rotated at about 6 rpm to assure uniform treatment. A nitrogen purge of 6.5 liters per minute was maintained during the second heating. In five other runs the shells were heated directly to 800° C. in the rotating furnace at ramp rate of 2° or 10° C. per minute and held at the 800° C. for 1 or 4 hours while maintaining a nitrogen or argon purge of 6.5 liters per minute. The product was cooled to room temperature under the inert purge gas ($N_2$) by allowing the furnace to cool down without any added cooling.

The data in Table 1 lists typical values of density, gravimetric oxygen capacity and volumetric oxygen capacity derived from pellet density as well as pore volume data for illustrative commercial or prior art non-selective and $O_2$ selective carbons. These can be compared with the coco charts made according to the procedure of this invention. In Example 1, the char was heated to 800° C. at a ramp rate of 2° C. per minute and a hold time of 4 hours. In Example 2 the ramp rate was 2° C. per minute to a temperature of 800° C. with a hold time of 1 hour. Example 3 used a ramp rate of 10° C. per minute to 800° C. and a hold time of 1 hour. Example 4 used the same conditions but argon was used as the inert gas instead of nitrogen which was employed in Examples 1, 2 and 3. Example 5 also used nitrogen purge gas at a ramp rate of 2° C. per minute to 800° C. and a hold time of 4 hours. Densities measured on granular material are referred to as pellet densities for comparison with pellet densities determined on commercial compressed pellets. Pellet density was determined by the "Hg pellet density" obtained by Hg porosimetry on a Micromeritics Hg Porosimeter, Model 9220. If not available from a supplier, we measured bulk density (tap density) by filling a 500 cc graduated cylinder, tapping the cylinder on a solid surface 10 times, and then recording the volume and mass of material within the cylinder. These Examples show that the best combinations of capacity and density were obtained at the conditions of pyrolysis according to the invention, demonstrating higher oxygen volumetric capacity as well as higher densities than the chars of the illustrated prior art listed as chars A-E.

TABLE 1

| Char | DENSITY (g/cc) | | PORE VOLUME (cc/g) | | | $O_2$ CAPACITY | |
|---|---|---|---|---|---|---|---|
| | Bulk | Pellet[a] | Total[b] | Hg[c] | Micro-[j] | (cc/g)$^{2[d]}$ | (cc/cc)[e] |
| Ex. 1[f] | 0.64 | 1.15 | 0.32 | 0.14 | 0.18 | 7.5 | 8.6 |
| Ex. 2 | — | 1.11 | 0.36 | 0.18 | 0.18 | 8.1 | 8.9 |
| Ex. 3 | 0.60 | 1.10 | 0.37 | 0.18 | 0.19 | 7.9 | 8.6 |
| Ex. 4 | 0.57 | 1.09 | 0.38 | 0.19 | 0.19 | 7.9 | 8.6 |
| Ex. 5 | — | 1.18 | 0.33 | 0.12 | 0.22 | 7.4 | 8.8 |
| A[g] | 0.44 | 0.67 | 1.03 | 0.57 | 0.46 | 8.1 | 5.4 |
| B | 0.53 | 1.02 | 0.56 | 0.36 | 0.20 | 7.1 | 7.2 |
| C | 0.58 | 1.04 | 0.58 | 0.40 | 0.25 | 7.7[h] | 8.0 |
| D | 0.27 | 0.45 | 1.76 | 1.17 | 0.60 | 8.5 | 3.8 |
| E | 0.55-.65 | 0.9-1.1 | NAV[k] | 0.5-0.6 | NAV[k] | ~8.0 | ~8.0 |

[a] Pellet density obtained by Hg porosimetry.
[b] From (1/He density)-(1/Hg density).
[c] From Hg porosimetry to 60,000 psi.
[d] Gravimetric gas capacity; 1 atm. $O_2$, 25° C.
[e] Volumetric $O_2$ capacity from grav. cap. × pellet density, (a) × (d).
[f] Chars of Examples 1-5 were all partially $O_2$ selective.
[g] Chars A-E are representative of commercial or prior art, non-selective carbons (CMS):
A — Norit Activated Carbon's "Sorbonorit 3".
B — Sutcliffe Speekman #203C
C — Kanebo Ltd., Tokyo, Japan (U.S. Pat. No. 4,933,314)
D — Anderson, Super Carbon GX-31
E — Takeda MSC from Nishino, et al., Kaguku to Kogyo, Vol 59, #5, pp 161-170 (1985).
[h] Capacity calculated from 25.5 mg/g, 17.9 cc/g, at 6.7 atm. ('314, Table 2)
[j] From (Total PV-Hg PV)
[k] NAV = Not Available From Reference The coco chars of Examples 1-5 were hard, irregular granular materials which did not need to pelletized to be of suitable character for use in absorbent beds in pressure swing adsorption. In general, the coco chars of the invention offered higher density (greater than 1.1 cc per gram) and higher gravimetric capacities (greater than 7.5 cc per gram) which in turn provided higher volumetric capacities (greater than 8.2 cc/cc). It was also noted that a hold time of 1 hour produced a faster sorbing material than a hold time of 4 hours (Table 4).

EXAMPLES 6-9

Four coco chars were made using different hold temperatures and purge rates and the products were then evaluated to determine the quantitative gas adsorption and adsorption rates for oxygen and nitrogen. The results are given in Table 2.

| EXAMPLE | HOLD TEMP. °C. | PURGE RATE L/min | GAS SORBED[a] mgO$_2$ | GAS SORBED[a] mgN$_2$ | kO$_2$[b] (sec$^{-1}$) | kN$_2$[b] (sec$^{-1}$) | SELECTIVITY kO$_2$ / kN$_2$ |
|---|---|---|---|---|---|---|---|
| 6 | 800 | 6.5 | 1.14 | 0.970 | 2.23 | 0.278 | 8.0 |
| 7 | 800 | 10.0 | 1.18 | 0.93 | 1.46 | 0.20 | 7.3 |
| 8 | 982 | 6.5 | 0.32 | 0.09 | 0.391 | 0.048 | 8.2 |
| 9 | 982 | 9.9 | 0.53 | 0.10 | 0.391 | 0.033 | 11.9 |

[a]mass of O$_2$ or N$_2$ sorbed by final sample weight at 25° C., 1 atm at O$_2$ equilibrium.
[b]rates of O$_2$ or N$_2$ sorption measured at room temperature (~23° C.) fitted with typical exponential curve: $N(t) = N(s)[1-e^{-kt}]$, where N is the amount sorbed at time (t) and at saturation (s) and k represents a mass transfer coefficient.

The above data demonstrate that at pyrolysis temperatures of 982° C. (1800° F.) compared to 800° C. the chars produced had significantly reduced rates of adsorption of both oxygen and nitrogen. The higher flow rate of 10 liters per minute compared to 6.5 liters per minute had only a slight effect at 800° C. The data show that not only was the amount of oxygen and nitrogen adsorbed substantially reduced but also the adsorption rates were lower with an operating temperature of 982° C. It is clear from the above data that beyond the minimum purge needed to efficiently remove off gases produced during pyrolysis, the final pyrolitic temperature influences oxygen and nitrogen adsorption rates more than does the purge rate. These comparative experiments were designed to match as closely as possible (given differences in constant temperature vs. our variable temperature furnaces) those in U.S. Pat. No. 4,594,163 to distinguish our material from alternative approaches disclosed in that patent.

EXAMPLES 10-18

In Examples 10-18 thin shelled coconut granules were pyrolyzed using 80 grams of raw coconut which were ramped to temperature at 2° C. per minute using two liters per minute of nitrogen purge followed by holding at the pyrolysis peak temperature for four hours. The reactor was allowed to cool to ambient temperature under an inert purge and once at room temperature, zero air replaced nitrogen and the reactor contents were stabilized by heating to 150° C.

A variety of coconut chars were prepared at temperatures ranging from 650°-900° C. and the chars were analyzed for pellet density on the granular material as formed from the shell (without pelletizing), micropore volume, oxygen adsorbent rate and selectivity, and both gravimetric and volumetric oxygen capacity. The results are given in Table 3.

75° C. Examples 14 and 16 which were prepared at 850° C. showed the highest gravimetric capacity of 8.4 cc/g. Further above 800° C., the O2 sorption rates begin to decrease to less attractive values. Since these carbon were much more dense than other commercial activated carbons, a capacity per volume of carbon of 10.2 cc/cc was obtained, which is an improvement of about 23% in capacity over commercially available CMS materials. The coconut chars have some O$_2$ selectivity but slow adsorption rates as prepared. Crushing the chars to smaller particle sizes, i.e., 75-114 μm, changed the selectivity only slightly, which indicates that the adsorption rates and selectivity arise from internal resistance to gas diffusion rather than just a selective surface layer. There was a general trend of larger capacity and selectivity with higher treatment temperatures up to 850° C. The higher temperatures of 900° C. appeared to decrease somewhat both gravimetric capacity and selectivity. The exception was the product from Example 15 which was prepared at 825° C. and displayed lower capacity for the temperature used. It was composed of larger chunks of carbon. Even so, the volumetric capacity was considerably above that which would be expected from readily available commercial CMS materials.

Varying the ramp rate did not adversely affect the oxygen adsorption properties. Although the literature describes creating microporosity in coconut shell char by heating to 500° C., much of the pores are blocked because of pyrolytic decomposition products. Heating to higher temperatures apparently removes the debris from the pores. A slow pyrolysis to 500° C. followed by rapid heating to 800° C. with a four hour soak time produced a char which was similar to those produced at 800° C. with a steady ramp rate and any improvements in microporosity were not apparent from CAU testing. In a similar run the shells were first heated to 500° C. in

TABLE 3

| EXAMPLE | HOLD TEMP.[a] °C. | Hg PELLET DENSITY g/cc | MICROPORE VOLUME cc/g | O$_2$ SORPTION RATE[b] min$^{-1}$ | SELECTIVITY[c] O$_2$/N$_2$ | O$_2$ CAPACITY GRAV. cc/g | O$_2$ CAPACITY VOL. cc/cc |
|---|---|---|---|---|---|---|---|
| 10[g] | 650 | 1.11 | 0.09 | 4.1 | 1.7 | 6.2 | 6.9 |
| 11 | 750 | 1.07 | 0.20 | 3.6 | 3.8 | 7.3 | 7.8 |
| 12 | 775 | 1.2[d] | — | 2.5 | 5.3 | 8.1 | 9.7 |
| 13 | 800 | 1.21 | 0.15 | 2.1 | 6.4 | 8.1 | 9.8 |
| 14[e] | 800 | 1.21 | 0.18 | 1.4 | 8.3 | 8.4 | 10.2 |
| 15[f] | 825 | 1.2[d] | — | 1.1 | 7.7 | 7.0 | 8.4 |
| 16[g] | 850 | 1.21 | 0.17 | 1.0 | 7.9 | 8.4 | 10.2 |
| 17 | 850 | 1.21 | — | 1.1 | 9.0 | 8.2 | 9.9 |
| 18[e] | 900 | 1.27 | 0.18 | 1.4 | 8.3 | 8.1 | 10.3 |

[a]Ramp rate of 2° C./min. to temp. which was held four hours, N$_2$ purge.
[b]Determined as described in footnote (b), Table 2.
[c]Calculated by (rate O$_2$ sorption)/(rate N$_2$ sorption).
[d]Estimated
[e]Thicker coconut shells than used in the other examples.
[f]Sample of shell consisted of larger chunks than used in the other examples.
[g]Not stabilized by heating in dry air to about 150° C. after formation.

The above data show that higher capacity and selectivity were obtained with pyrolysis temperatures above nitrogen at 2° per minute, cooled to ambient then reheated to 500° C. at 10° per minute and from there to 800° C. at 2° per minute. The results of this run showed oxygen diffusivities remained high but the nitrogen diffusion was somewhat slower than in the runs made at 800° C. with a steady ramp rate. A high nitrogen diffusion rate is desirable since low diffusivity tends to limit the amount of hydrocarbon cracking that can be done to boost the selective porosity of the CMS.

EXAMPLES 19-25

In these Examples coconut char was prepared as described in the data given in Table 4 and compared by analysis for pellet density, oxygen and nitrogen adsorption rate and selectivity with previous examples in order to illustrate the result of varying the hold time, the hold temperature, the ramp rate as well and the nature of the purge gas. $N_2$ was used as the purge gas for all examples except where indicated otherwise.

pellet density measurements) and $O_2$ capacity while retaining fast adsorption rates.

CAU adsorption rates were determined on several of the chars prepared according to the Examples listed in Table 5 with pyrolysis temperatures ranging from 650°-900° C.

| Example | Hold Temp. °C | CAU Adsorption Results ||||
|---|---|---|---|---|---|
| | | % $O_2$ | Time (min.) | L | m | Final Pressure torr |
| 10 | 650 | 18 | 0.3 | — | — | 300 |
| 11 | 750 | 16.6 | 0.3 | 8 | 1.5 | 280 |
| 41 | 750 | 15.8 | 0.4 | 5.4 | 1.4 | 250 |
| 12 | 775 | 14.7 | 0.4 | 7.1 | 1.1 | 270 |
| 13 | 800 | 14.6 | 0.4 | 8.9 | 0.43 | 255 |
| 15 | 825 | 14.3 | 0.5 | 8.9 | 0.29 | 265 |
| 17 | 850 | 14.1 | 0.6 | 7.9 | 0.15 | 255 |
| 14[a] | 800 | 14.3 | 0.4 | 9.0 | 0.65 | 270 |
| 18[a] | 900 | 13.4 | 0.7 | 7.0 | 0.11 | 270 |

[a]Thicker shells from Costa Rica.

TABLE 4

| EXAMPLE | HOLD TEMP. °C. | HOLD TIME HRS. | RAMP RATE °C./MIN. | Hg Pellet DENSITY g/cc | SORPTION RATE[a] || $\alpha^{(b)}$ SELECTIVITY $N_2/O_2$ | VOLUMETRIC CAPACITY cc/cc |
|---|---|---|---|---|---|---|---|---|
| | | | | | $\Theta O_2$ SEC. | $\Theta N_2$ SEC. | | |
| 1[c] | 800 | 4 | 2 | 1.15 | 41 | 521 | 13 | 8.6 |
| 18 | 900 | 4 | 2 | 1.27 | 113 | 1351 | 12 | 10.3 |
| 19[c] | 650 | 4 | 2 | 1.05 | 3 | 14 | 5 | |
| 20 | 750 | 4 | 2 | 1.09 | 56 | 332 | 6 | |
| 21 | 850 | 1 | 2 | 1.05 | 138 | 2650 | 19 | |
| 2 | 800 | 1 | 2 | 1.11 | 18 | 198 | 11 | 8.9 |
| 3 | 800 | 1 | 10 | 1.10 | 25 | 286 | 11 | 8.6 |
| 4[d] | 800 | 1 | 10 | 1.09 | 12 | 146 | 12 | 8.6 |
| 22[c] | 800 | 1 | 10 | 1.18 | 12 | 133 | 11 | |
| 23[d] | 800 | 1 | 10 | 1.15 | 12 | 145 | 12 | |
| 24[c] | 800 | 1 | 10 | 1.19 | 13 | 142 | 11 | |
| 25 | 800 | 0.3 | 10 | 1.10 | 7 | 93 | 13 | |

[a]volumetric method to determine $\Theta$ sorption rate: the time required to reach 67% loading with P(initial) = O and P(bulk) = 760 torr, 20° C. Lower figures indicate faster rates.
[b]$\alpha$ selectivity is the ratio of $\Theta$ sorption rates, $N_2/O_2$.
[c]Examples grouped together used coconut shells from the same lot.
[d]argon used as purge gas As shown by the above data reducing the hold time at the maximum pyrolysis temperature from 4 hours to 1 hour increased the gas uptake rates of the char without significantly changing the nitrogen/oxygen selectivity. The char held at maximum temperature for only 18 minutes (Example 25) showed the fastest adsorption rate of the chars prepared above 650° C. and higher temperatures are required to reach the higher volumetric capacity. The ramp rates in the range of 2°-10° C. per minute produced only a marginal difference in adsorption rates. Also the data show no significant difference in chars produced with either nitrogen or argon as the purge gas.

Comparing Examples 1 and 18, the uptake rate decreased as the pyrolysis temperature increased from 800° C. to 900° C., although selectivity remained essentially constant. Similar results are evident from Examples 19 and 20.

When the pyrolysis temperature was increased from 750° C. to 850° C. and the hold time decreased from 4 hours to 1 hour (Examples 20 and 21), the uptake rate continued to decrease, but the selectivity increased dramatically, indicating a decrease in the average micropore diameter. Thus pyrolysis at 800° C. for <1 hour allows one to obtain optimum char density (via Hg As demonstrated by the above data the CAU oxygen adsorption was similar for both the thin shelled coconut char and the thicker shelled material (Examples 14 and 18). Adsorption rates diminished in the chars prepared at the highest temperature as the pore structure became smaller and the carbon became more graphitic. The higher temperatures clearly show an improvement in oxygen adsorption capacity as indicated by the percent oxygen in the CAU test as well as the final pressure for the coconut shell chars prepared at temperatures of 775° C. and above.

EXAMPLES 26-40

Gas phase treatments were developed to increase the adsorption capacity of the coconut shell chars using mixtures of 25% carbon dioxide in helium, 3% water in helium and 1% oxygen in helium. All three were effective at gasifying the carbon precursors between 800° and 900° C. In Examples 30, 32 and 33 the carbon granules were impregnated with 0.03 molar solutions of either nickel acetate or calcium acetate in order to catalyze the gasification reaction. The data for these Examples including the char preparation conditions, the gasification conditions and analysis for pellet density and oxygen capacity are given in Table 6.

TABLE 6

| Example | Char Process Temp. °C. | Char Process Time Hrs. | Gasification Char Ex. | Gasification Treating Gas | Gasification Temp. °C. | Gasification Time Hrs. | Hg Pellet Density g/cc | $O_2$ Capacity Grav. cc/g | $O_2$ Capacity Vol. cc/cc |
|---|---|---|---|---|---|---|---|---|---|
| 26 | 800 | 4 | | | | | 1.14 | 8.6 | 9.8 |
| 27 | | | 26 | 3% $H_2O$ | 800 | 1 | 1.19 | 8.9 | 10.6 |
| 28 | | | 26 | 25% $CO_2$ | 800 | 1.75 | 1.26 | 9.1 | 11.5 |
| 29 | | | 26 | 25% $CO_2$ | 800 | 3.75 | 1.22 | 8.4 | 10.2 |
| 19 | 650 | 4 | | | | | 1.05 | 6.5 | 6.9 |
| 30[a] | | | 19 | 25% $CO_2$ | | 1 | 1.06 | 8.7 | 9.2 |
| 31 | 800 | 4 | | | | | 1.12 | 8.7 | 9.7 |
| 32[b] | | | 31 | 25% $CO_2$ | 900 | 0.5 | 1.07 | 10.2 | 10.9 |
| 33[a] | | | 31 | 25% $CO_2$ | 800 | 0.5 | 1.09 | 9.3 | 10.1 |
| 34 | 800 | 4 | | | | | 1.08 | 5.3 | 5.8 |
| 35 | | | 34 | 25% $CO_2$ | 800 | 0.9 | 1.21 | 8.9 | 10.7 |
| 17 | 850 | 4 | | | | | 1.21 | 9.2 | 11.1 |
| 36 | | | 17 | 3% $H_2O$ | 800 | 1 | 1.16 | 10.1 | 11.7 |
| 37 | | | 17 | 1% $O_2$ | 800 | .02 | 0.99 | 10.0 | 9.9 |
| 38 | | | 17 | 1% $O_2$ | 650 | 0.1 | 1.09 | 10.7 | 11.7 |
| 39 | 800 | 4 | | | | | 1.14 | 8.3 | 9.5 |
| 40 | | | 39 | 25% $CO_2$ | 800 | 1 | 1.12 | 9.7 | 10.8 |
| 41 | 800[c] | 1 | | | | | 1.27 | 6.8 | 8.6 |
| 42 | | | 41 | 25% $CO_2$ | 800 | 0.25 | 1.19 | 7.7 | 9.1 |
| 43 | 800[c] | 1 | | | | | 1.15 | 7.9 | 9.1 |
| 44 | | | 43 | 25% $CO_2$ | 800 | 0.25 | 1.10 | 7.9 | 8.7 |
| 45 | 800[c] | 1 | | | | | 1.14 | 7.4 | 8.4 |
| 46 | | | 45 | 25% $CO_2$ | 800 | 0.25 | 1.15 | 8.0 | 9.2 |
| 47 | 800[c] | 1 | | | | | 1.18 | 7.2 | 8.5 |
| 48 | | | 47 | 25% $CO_2$ | 800 | 0.5 | 1.17 | 7.9 | 9.2 |

[a]Plus catalyst of 0.03M Ni acetate.
[b]Plus catalyst of 0.03M Ca acetate.
[c]Ramp rate of 10° C./mm.

Treating the coconut shell chars with 25% carbon dioxide in helium at 800° C. for 1 hour increased the oxygen adsorption capacity to at least 8.4 and more often above 9.1 cc/cc, but the chars were made nonselective. Since the gasification treatment was also found to decrease micropore resistance to gas diffusion, the treatment was incorporated with multiple steps needed to prepare an oxygen selective CMS from the precursor carbon. Alternative gasification treatments with mixtures including 3% water and 1% oxygen were also effected. The use of nickel acetate impregnation (Examples 30 and 33) served to increase capacity and raise adsorption rates for the coconut char. Although the gasification step (Example 30) also increased the capacity of chars prepared at 650° C., the lower density of the char did not permit the volumetric capacity to reach the values demonstrated for modification of the chars made at 800° and 850° C. Additional capacity increase was also obtained by reacting a char treated with calcium acetate (Example 32) at a gasification temperature of 900° C.

In Examples 41-48 the coconut chars prepared at 800° C. under conditions which produced small microparticle domains, and consequently fast $O_2$ uptake rates, were subsequently oxidized at 800° C. using a 25% blend of carbon dioxide in helium. Oxidation times were varied based upon nitrogen adsorption rates from CAU analysis. The chars produced in this series had CAU nitrogen adsorption coefficients which ranged from 0.1 to 1.5. Oxidation times were adjusted so that a char with slow nitrogen adsorption rates received longer exposure to carbon dioxide. The carbon dioxide exposure produced faster nitrogen rates and high oxygen capacity in all but one case, this being Example 44. The treatment had minimal impact on pellet density; the maximum density loss was only 6%. Changes in gravimetric oxygen adsorption rates as a result of $CO_2$ oxidation were minimal for chars already exhibiting fast oxygen adsorption rates (Examples 41 and 43).

EXAMPLES 49-54

As shown by Examples 49-54 and the data presented in Table 7, coconut chars prepared at 800° C. were amenable to a single step cracking treatment with isobutylene diluted with helium to improve their oxygen adsorption characteristics. Molecular probe (plug gauge experiments) indicate the micropore distributions of these materials in the 3.7 to 6 Å region resemble other available $O_2$ selective CMS. From this it is clear that the untreated coconut chars made at 800° C. have a micropore distribution similar to a 4 Å CMS (for example MSC-A or MSC-4A as designated by Takeda Chemical Industries, by K. Kawazoe and T. Kawai in Seisan Kenkyu 22, 11, pp 491-493 (1970)). The base char was prepared from granular coconut shells (−8 to +25 mesh) at 800° C. (Example 49) in nitrogen using a 2° C. per minute ramp rate and a 4 hour soak at the maximum temperature. A series of coking steps primarily at 500° C. produced oxygen selective carbon molecular sieves (Example 54) which took the CAU oxygen levels below 12% with a selectivity of 27.

| Example | Material From Ex. | Isobutylene[b] Modification Time (min.) | Isobutylene[b] Modification Temp. °C. | CAU Results $O_2$ Adsorption % | CAU Results $O_2$ Adsorption Time (min.) | CAU Results Ads.[a] $O_2$ (L) | CAU Results Rates $N_2$ (m) | Pressure Initial (torr) | Pressure Final (torr) |
|---|---|---|---|---|---|---|---|---|---|
| 49 | Base Char | | | 15.2 | 0.5 | 7.7 | 0.31 | 575 | 258 |
| 50 | 49 | 30 | 500 | 14.1 | 0.3 | 10.6 | 0.5 | 579 | 255 |
| 51 | 50 | 60 | 500 | 13.1 | 0.4 | 8.4 | 0.42 | 593 | 260 |

-continued

| | | Isobutylene[b] Modification | | CAU Results | | | | | |
|---|---|---|---|---|---|---|---|---|---|
| | Material | | | O$_2$ Adsorption | | | | Pressure | |
| Example | From Ex. | Time (min.) | Temp. °C. | % | Time (min.) | Ads.[a] O$_2$ (L) | Rates N$_2$ (m) | Initial (torr) | Final (torr) |
| 52 | 51 | 60 | 500 | 12.4 | 0.6 | 7.2 | 0.27 | 596 | 260 |
| 53 | 52 | 150 | 625 | 14.7 | 0.4 | 11.4 | 0.17 | 597 | 260 |
| 54 | 53 | 30 | 500 | 11.9 | 0.7 | 5.6 | 0.21 | 599 | 270 |

[a]Ads. = adsorption
[b]20% isobutylene in helium

In the above table the data presented are shown with the product of each Example serving as the starting material for the subsequent Example, ending with Example 54. A computational method (which employs a detailed model of mass transfer within CMS pellets and has been shown to correlate fundamental CMS properties and process performance) predicts that the CMS of Example 54, despite somewhat lower selectivity and slower oxygen uptake rate than some commercial sieves, according to CAU analysis, would out perform those commercial sieves by an added 6% gain in productivity and an added 4% gain in recovery because of its high volumetric capacity.

EXAMPLE 55

A gasified coconut shell char was modified with a hydrocarbon to produce an oxygen selective material. The coconut char of Example 5 was heated in helium to 800° C. and treated with 25% carbon dioxide in helium for 30 minutes, then treated with helium as it cooled to room temperature. The resulting material had a pore volume of 0.34 cc/g, an Hg pore volume of 0.12 cc/g, a micropore volume of 0.22 cc/g and an Hg pellet density of 1.18 g/cc.

A sample of 12.0 grams of the gasified material was placed in a static tube furnace and treated with a mixture of 20% isobutylene in helium to the peak temperature with a ramp rate of 10° C. per minute. The peak temperature was at 500° C. which was held for 30 minutes, then 500° for 1 hour, 500° for another hour, 525° for 13 minutes and 500° for 30 minutes. Between each treatment the sample was cooled to room temperature and analyzed by CAU to estimate its performance. The final product had an L value of 5.6 and m of 0.21. The system pressure at one hour equaled 265 mm of Hg. The oxygen capacity was 8.2 cc/g with a volumetric capacity of 9.6 cc/cc demonstrating a char which ultimately should offer better productivity and recovery over commercial alternatives.

EXAMPLE 56

The oxidized coconut char of Example 48 was treated successively with 1,2,4-trimethylcyclohexane (TMC) and isobutylene at 626° C. and 525° C., respectively. Exposure to TMC was for 30 minutes at a space velocity of one volume exchange per minute and a vapor phase concentration of TMC of about 1% in helium. Treatment with 20% isobutylene in helium was conducted at a space velocity of 0.8/min. for an additional 60 minutes. CAU analysis showed a minimum O$_2$ concentration of 13.6% in 0.4 min., L of 8.2 and m of 0.18, with 82% of the pores selective.

Other advantages and embodiments of our invention will be apparent to those skilled in the art from the foregoing disclosure and the following claims without departing from the spirit or scope of the invention.

We claim:

1. A method of making a high O$_2$ capacity carbon molecular sieve material which comprises,
   (a) crushing and sizing raw coconut shells to form shell granules having a size suitable for use in an adsorbent bed for pressure swing adsorption,
   (b) heating said granules in a flowing stream of inert gas at an average temperature ramp rate of about 2° C. to 12° C. per minute to a peak temperature of 775° to 900° C.,
   (c) holding said peak temperature for a period of time so that the total heating and holding steps total not less than 1 hour nor more than 8 hours to produce granular char,
   (d) cooling said granular char in an inert gas atmosphere, and
   (e) recovering said product of step (d) having a volumetric oxygen capacity greater than 9.0 cc/cc at ambient conditions.

2. The method of claim 1 wherein said ramp rate is steady at about 2° to 10° C. per minute, said peak temperature is 775° to 850° C., and said holding time at peak temperature is from 15 minutes to 1 hour.

3. The method of claim 1 wherein said inert gas is nitrogen flowing at a rate sufficient to carry away from the granules pore-plugging decomposition products of any volatilized organic material.

4. The method of claim 1 further comprising gasification of said granular char by heating to about 600° to 950° C. in a mixture of inert gas and an oxidant selected from CO$_2$, H$_2$O and O$_2$, or CO$_2$ alone, for a time sufficient to increase the oxygen capacity of said char but reduce its oxygen selectivity with respect to nitrogen.

5. A method of making a carbon molecular sieve suitable for use in air separation by pressure swing adsorption which comprises forming a coconut char by the method of claim 1 and further comprising reducing the effective pore openings of said char by contact with a volatile carbon-containing organic compound under pyrolysis conditions.

6. A method of making a carbon molecular sieve suitable for use in air separation by pressure swing absorption which comprises forming a gasified coconut char by the method of claim 4, and further comprising reducing the effective pore openings of said gasified char by contact with a volatile carbon-containing organic compound under pyrolysis conditions.

7. The method of claim 5 wherein said volatile organic compound is hydrocarbon.

8. The method of claim 6 wherein said volatile organic compound is hydrocarbon.

9. The method of claim 8 wherein said gasified coconut char is contacted sequentially with two hydrocarbons, the second hydrocarbon having a molecular dimension smaller than the first.

10. The method of claim 4 wherein said gasification is carried out with a mixture of helium and $CO_2$ at a temperature of about 750° to 900° C.

11. The method of claim 2 further comprising abrading said granular char to remove sharp edges remaining on the granules formed by crushing the coconut shells, thereby reducing attrition in subsequent use as a carbon molecular sieve.

* * * * *